UNITED STATES PATENT OFFICE.

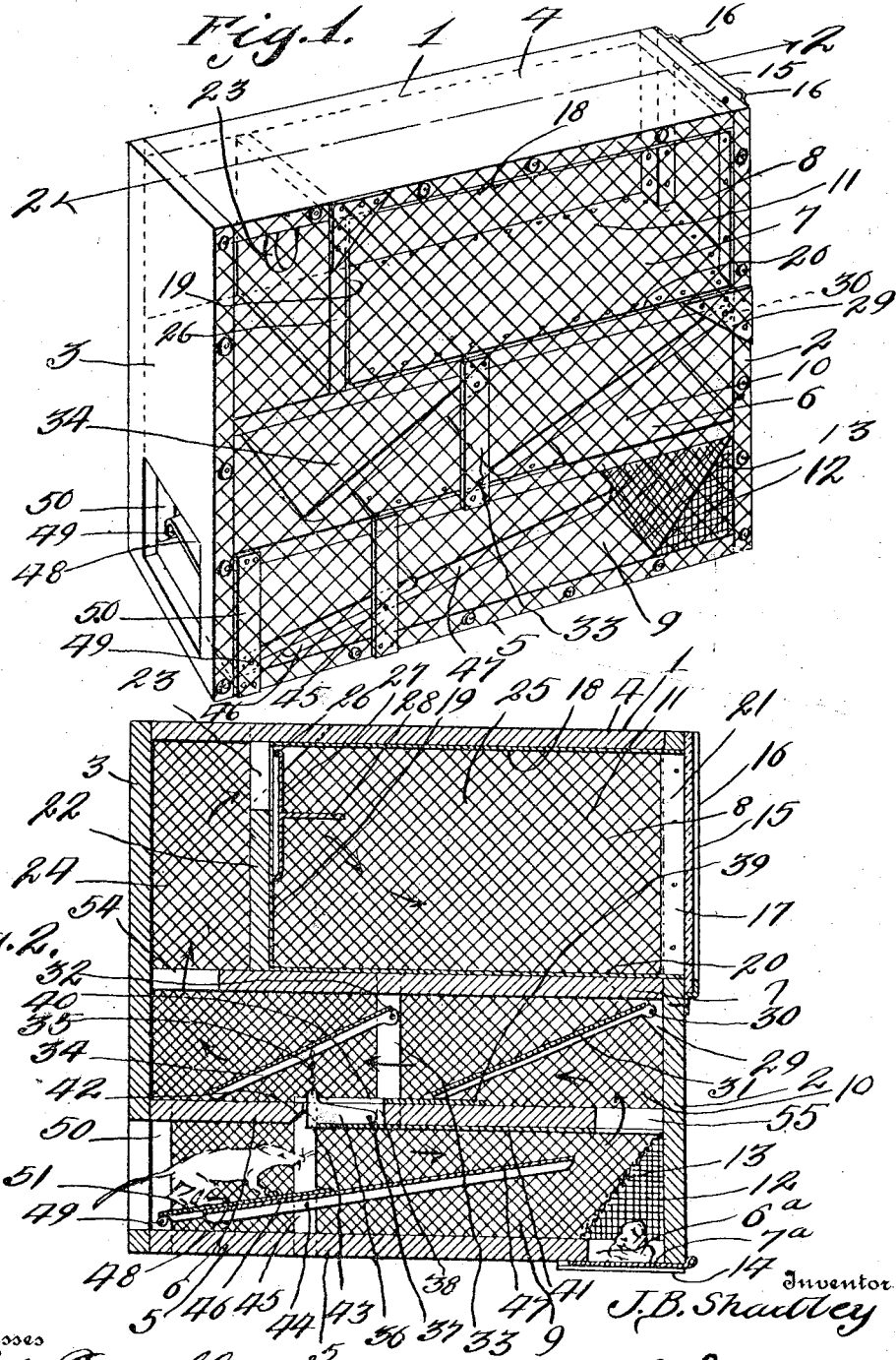

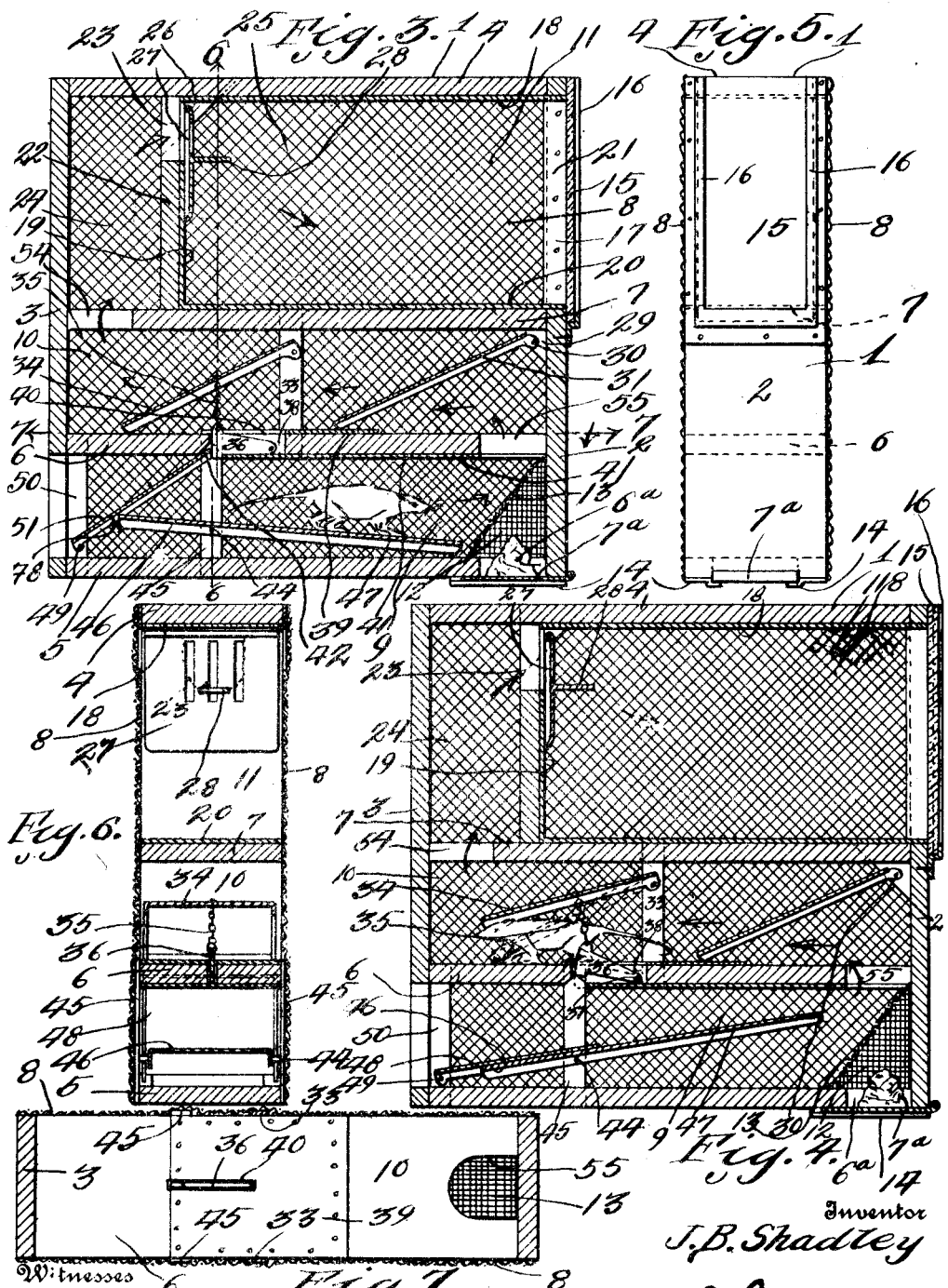

JAY B. SHADLEY, OF DANVILLE, ILLINOIS.

TRAP.

1,155,842.      Specification of Letters Patent.      Patented Oct. 5, 1915.

Application filed April 8, 1915. Serial No. 19,957.

*To all whom it may concern:*

Be it known that I, JAY B. SHADLEY, a citizen of the United States, residing at Danville, in the county of Vermilion and State of Illinois, have invented a new and useful Trap; and I do hereby declare the following to be a full, clear, and exact description of the invention, such as will enable others skilled in the art to which it appertains to make and use the same.

This invention relates to the art of trapping, and particularly to a new and useful rat or mouse trap, and an object of the invention is to provide a trap comprising a plurality of tiers and having victim set means for preventing the backward passage of the rat.

Another object of the invention is to provide a trap having a continuously baited receptacle for enticing the rat or the like into the trap, which is always set and as one rat or mouse enters the trap its backward passage is prevented by an automatically tripped closure, and as the rat passes from one end of the second tier to its other end, means are automatically actuated, to automatically reset said closure, for the entrance of another rat or the like.

In practical fields the details of construction may necessitate alterations, falling within the scope of what is claimed.

The invention comprises further features and combination of parts, as hereinafter set forth, shown in the drawings and claimed.

In the drawings:—Figure 1 is a view in perspective of the improved trap constructed in accordance with the invention. Fig. 2 is a sectional view on line 2—2 of Fig. 1. Fig. 3 is a sectional view similar to Fig. 2 showing a rat having entered the trap, and automatically actuated a device to prevent the back passage of the rat. Fig. 4 is a sectional view similar to Figs. 2 and 3 showing the rat having passed to the second tier and actuated another device or closure to prevent its backward passage, and in the act of passing under a third device or closure, which actuates a member for releasing the first closure or device so that it may automatically reset itself. Fig. 5 is an end view of the trap. Fig. 6 is a sectional view on line 6—6 of Fig. 3. Fig. 7 is a sectional view on line 7—7 of Fig. 3.

Referring more especially to the drawings, 1 designates the rectangular casing or structure comprising the ends 2 and 3, the top and bottom pieces 4 and 5 and the intermediate horizontally disposed pieces 6 and 7, and the wire meshwork sides 8. The intermediate pieces or tiers 6 and 7 form a plurality of compartments 9, 10 and 11, and in one end of the lower compartment 9 a bait compartment 12 is formed by an angularly disposed meshwork piece 13. The bottom piece 5 of the casing has an opening 6ª, which is closed by the slide 7ª, which is mounted in suitable guides 14. To bait the trap the slide 7ª is removed and the bait is inserted in the opening 6ª into the bait compartment 12. A glass slide 15 is mounted in guides 16 of the end 2 of the casing, for closing the opening 17 to the compartment 11. The compartment 11 is lined with sheet metal as shown at 18, 19, 20 and 21, to prevent the rat or mouse from gnawing its way out of the compartment 11. The sheet metal lining 19 is secured to a partition 22, (which is provided with an opening 23) which partition divides the compartment 11 into two chambers 24 and 25. Hinged at 26 adjacent the upper portion of the partition 22 adjacent the metal lining 19 is a gravity actuated closure member 27 having a laterally extending weight 28, which insures the gravitation of the closure 27, and also limits the closure in swinging open, the same being forced against its gravitation by the rat passing through the opening 23. The weigh 28 contacts with the top piece 4 to limit movement of the closure 27. Hinged to oppositely disposed triangular metal pieces 29 as at 30 is an angularly arranged trap member or closure 31, and hinged at 32 to oppositely disposed metal strips 33 is another trap member or closure 34, which has a chain connection 35 to a latch 36, which is pivoted at 37 in a slot 38 of the intermediate piece 6. Where the trap member or closure 31 rests, it engages a metal plate 39 having a slot 40 in registration with a slot 38, and upon the under face of the intermediate piece 6 is a plate 41, which covers the slot 38 with the exception of the small part thereof as shown at 42, so that the lug 43 of the latch 36 will protrude therethrough, in the manner shown clearly in Figs. 2 and 3.

Pivoted at 44 to oppositely disposed strips 45 is a trap member 46 comprising long and short portions 47 and 48. Pivoted at 49 to the opposite strips 50 is a trap member 51, the setting position of which is when the same is normally in engagement with the short part 48 of the trap member 46, thereby holding the trap member 46 positioned as shown in Fig. 2. The intermediate piece 7 has an opening 54 into the chamber 21, and the intermediate piece 6 has an opening 55, so that the rat may pass from the lower compartment 9 to the second compartment 10. As before stated, the bait is in the compartment 12, and it attracts the rat into the compartment 9 upon the trap members 46 and 51. As the rat passes on to the longer end 47 of the trap member 46, the short end 48 tilts upwardly, thereby disposing the trap member 51 to the position shown in Fig. 3, its free ends engaging the small recessed part 42 of the slot 48, and in engagement with the latch 36.

With the trap member 46 and 51 in the position shown in Fig. 3, it will be noted that the backward passage of the rat is prevented, the trap member 51 being thrown up in its path. The only course for the rat to take is through the opening 55 to the second compartment, and it is a natural instinct for an animal or the like to keep moving from one place or closure or compartment to another as long as it is possible, always eager to gain freedom, therefore after the rat reaches the compartment 10, it will pass under the trap members 31 and 34, which as will be noted prevents the backward passage of the animal. However as the animal passes the trap member 31 the latch 36 is automatically raised, thereby automatically releasing the trap member 51 (which assumes the normal condition as shown in Figs. 2 and 4 by gravitation, and at the same time restores the trap member 46) and after the rat passes the trap member 34, it will naturally continue through the opening 54, and finally through the opening 23 into the compartment 11. After the animal reaches the compartment 11 he will start for the opening 17 with the purpose of gaining freedom, owing to the fact that he can see clearly through the glass closure, which will prevent his escape.

The invention having been set forth, what is claimed as new and useful is:—

1. A trap comprising a casing having three compartments superimposed, the inner end of the lower compartment having a bait chamber, a pair of trap members pivotally mounted in the lower compartment, one disposed in parallelism to and upon the other, one designed to be overbalanced by the weight of the animal to actuate and close the other trap member, means for automatically catching and holding the closed trap member, an opening between the lower compartment and the adjacent compartment, a pair of trap members in said adjacent compartments to prevent the backward passage of the animal, one of the trap members in the adjacent compartment when tilted upwardly operating said catching and holding means for releasing the first closure or trap member, the upper compartment being divided into two chambers, and means for preventing the backward passage of the animal from one chamber to the other.

2. An animal trap comprising a casing having three compartments super-imposed, the lower or first compartment having a bait chamber at one end, a trap member pivoted in the lower compartment having long and short portions, a second trap member pivoted in the lower or first compartment and lying against and in parallelism to the short portion of the first trap member holding the same set for the animal, the longer portion of the first trap member designed to be overbalanced by the weight of the animal causing the short portion to tilt the second trap member upwardly to close the first or lower compartment, a latch pivotally carried by the bottom of the second or adjacent compartment and protruding slightly below the bottom to automatically engage and hold the second trap member when closed, an opening between the first and second or adjacent compartment, and means in the second or adjacent compartment, actuated by the animal to operate the latch to release the second trap member of the first or lower compartment, the uppermost compartment being divided into two chambers and having means to prevent the retrograde passage of the animal to one chamber or the other.

In testimony whereof I have signed my name to this specification in the presence of two subscribing witnesses.

JAY B. SHADLEY.

Witnesses:
E. A. SHADLEY,
E. R. SHADLEY.